March 4, 1958    J. S. GOLDBERG    2,825,133
GARDEN TOOL
Filed Feb. 8, 1957
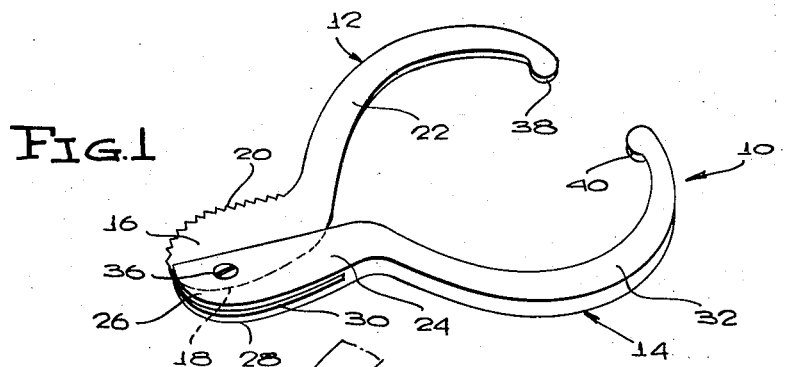
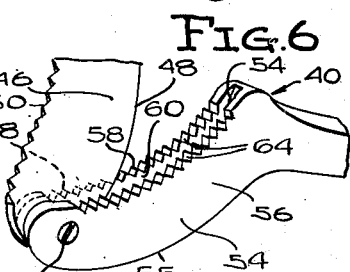
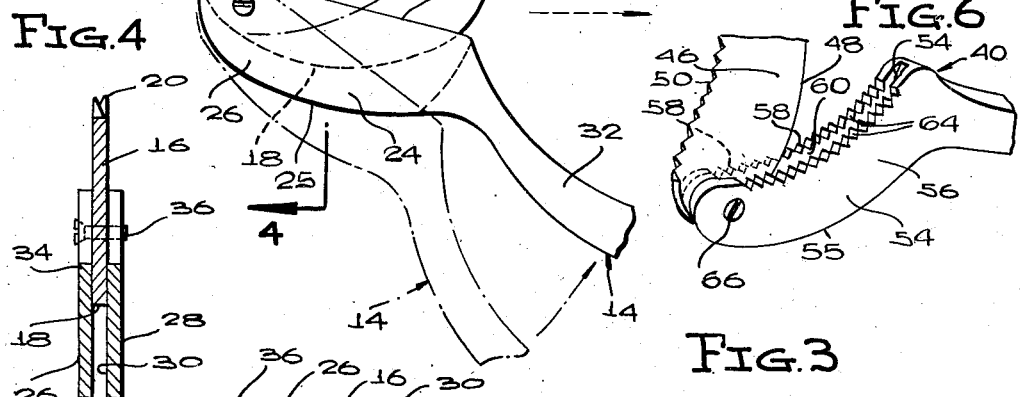
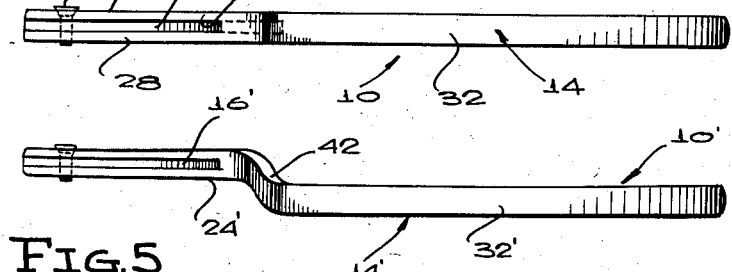
INVENTOR.
JOHN S. GOLDBERG
BY
McMorrow, Berman + Davidson
ATTORNEYS

2,825,133
GARDEN TOOL

John S. Goldberg, Houston, Tex.

Application February 8, 1957, Serial No. 639,014

5 Claims. (Cl. 30—253)

This invention relates to improved shearing tools usable for pruning bushes, hedges, and the like, and for severing chicken bones and the like.

The primary object of the invention is to provide more practical and efficient tools of this kind which are unusually simple in construction and which can be made of readily available flat stock with a minimum of fabricating operations.

Another object of the invention is to provide tools of the character indicated which can be made in attractive, rugged, and serviceable forms at relatively low cost, are easily used, and are highly satisfactory and practical for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a perspective view of one form of the invention;

Figure 2 is an enlarged top plan view of Figure 1, partly broken away, and showing in phantom lines an open position of the tool;

Figure 3 is a side elevation of Figure 1;

Figure 4 is an enlarged fragmentary transverse section taken substantially on the line 4—4 of Figure 2, Figure 5 is a side elevation view similar to Figure 3 of another form of the invention; and, Figure 6 is a fragmentary enlarged perspective view of a further form of the invention.

Referring in detail to the drawings, and first to Figures 1 to 4 thereof, the tool therein shown and indicated generally at 10, comprises a pair of generally similar question-mark shaped levers 12 and 14.

The levers 12 and 14 comprise arcuate handle portions 22 and 32 terminating at their forward ends in substantially radial jaws 16 and 24. The jaw 16 of the lever 12 is of elongated oval shape and has a longitudinally curved convex outer saw edge 20, and a longitudinally curved convex inner shearing edge 18.

The jaw 24 of the lever 14 is elongated like the jaw 16, but has a plain longitudinally curved convex outer edge 25 and a straight longitudinal plain inner side edge 34. The jaw 24 is bifurcated from its forward end to define a slot 30 which opens through the forward end and the side edges of the jaw 24, and which receives the forward end and the inner edge portion of the jaw 16. A pivot screw 36 traverses the forward ends of the jaws 16 and 24 in the regions of their inner edges and pivots the levers 12 and 14 together. The slot defines spaced plates 26 and 28 on the jaw 24, each of which has an inner shearing edge constituting the inner edge 34 of the jaw 24. The handle portions 22 and 32 have laterally inwardly projecting terminals 38 and 40 on their rear ends which facilitate maintaining hand grips on the handle portions during operation of the tool.

Referring to Figure 2, when the levers 12 and 14 are in the open position, shown in phantom lines, material to be cut is drawn forwardly between the levers 12 and 14, by a rearward movement of the tool relative thereto, toward and between the jaws 16 and 24, and the levers 12 and 14 are closed to the solid line position, so that shearing edges of the jaws 16 and 24 pass each other and cut the material.

In the form of the invention shown in Figure 5, the tool 10' is similar to that in Figures 1 to 4, except that the handle portions 22' and 32' are offset into a plane parallel to the jaws 16' and 24' by bends 42 at the forward ends of the handle portions.

In the form of the invention shown in Figure 6, the tool 40 differs from those of Figures 1 to 4, and 5, only in the formations of its jaws 46 and 54, corresponding to the jaws 16, 16' and 24, 24'.

The jaw 46 has a concave longitudinal outer saw edge 50 and a convex longitudinal inner shearing edge 48. The jaw 54 has a concave longitudinal inner saw tooth shearing edge 64, on the plates 56 and 58, and an outer convex longitudinal edge 55. The paws 46 and 54 are pivoted together at their forward ends by a pivot screw 66, with the jaw 46 disposed in the slot 60 of the jaw 54.

The concave toothed inner edges 64 prevent material being cut from moving longitudinally along the jaws.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. A pruning tool comprising first and second substantially similar levers, said levers comprising arcuate handle portions disposed with the concave sides in facing relation, said arcuate handle portions having forward and rear ends, first and second radial jaws on the forward ends of the related handle portions, said jaws being elongated and having forward ends, said jaws having outer longitudinal side edges and inner longitudinally shearing edges in shearing relation to each other, and a pivot traversing the forward ends of and pivoting the levers together, said second jaw being bifurcated from its forward end so as to define a slot opening through its outer and inner edges and so as to define spaced plates on said second jaw having inner side edges constituting the inner shearing edge of said second jaw, said first jaw being thinner than said second jaw and having its forward end and a portion in the region of its inner edge disposed in said slot.

2. A pruning tool according to claim 1 wherein said inner shearing edge of the first jaw is convex and longitudinally curved and the inner shearing edges of the second jaw are straight.

3. A pruning tool according to claim 1, wherein said handle portions have lateral bends at their forward ends and the handle portions are offset into a plane parallel to the jaws.

4. A pruning tool according to claim 1, wherein the inner shearing edge of said first jaw is longitudinally curved and convex and the inner shearing edges of said second jaw are longitudinally curved and concave.

5. A pruning tool according to claim 1, wherein the inner shearing edge of said first jaw is longitudinally curved and convex and the inner shearing edges of said second jar are longitudinally curved and concave saw tooth edges.

References Cited in the file of this patent

UNITED STATES PATENTS

| | | |
|---|---|---|
| 59,168 | Bender | Oct. 30, 1866 |
| 129,493 | Payne | July 16, 1872 |
| 1,085,793 | Bottger | Feb. 3, 1914 |
| 1,524,197 | Mayhew | Jan. 27, 1925 |

FOREIGN PATENTS

| | | |
|---|---|---|
| 11,779 | Great Britain | of 1884 |
| 561,518 | France | Oct. 23, 1923 |
| 807,075 | France | Oct. 5, 1936 |